United States Patent [19]
Lecours

[11] Patent Number: 6,109,595
[45] Date of Patent: Aug. 29, 2000

[54] APPARATUS AND METHOD FOR PROJECTING LINES

[75] Inventor: Yves C. Lecours, St. Lazare, Canada

[73] Assignee: Groupe Inventnet. Com, Inc., St. Lazare, Canada

[21] Appl. No.: 09/335,837

[22] Filed: Jun. 18, 1999

[51] Int. Cl.[7] .................................................. B65H 54/00
[52] U.S. Cl. ................................ 254/134.4; 254/134.3 FT
[58] Field of Search ....................... 254/134.4, 134.3 FT; 138/93

[56] References Cited

U.S. PATENT DOCUMENTS

| | | |
|---|---|---|
| 423,134 | 3/1890 | Cope ...................................... 254/134.4 |
| 443,823 | 12/1890 | Cope . |
| 1,851,435 | 3/1932 | Jessup . |
| 2,515,953 | 7/1950 | Dufresne . |
| 3,034,766 | 5/1962 | Hamrick . |
| 3,052,451 | 9/1962 | Hamrick . |
| 3,179,375 | 4/1965 | Hamrick . |
| 4,498,659 | 2/1985 | Brockelsby, III . |
| 4,840,352 | 6/1989 | Ellis . |
| 4,848,734 | 7/1989 | Ford . |
| 5,762,321 | 6/1998 | Petersen et al. . |
| 5,813,658 | 9/1998 | Kaminski et al. . |
| 5,901,752 | 5/1999 | Lundman .................................. 138/93 |

*Primary Examiner*—David A. Scherbel
*Assistant Examiner*—Lee Wilson
*Attorney, Agent, or Firm*—Swabey Ogilvy Renault

[57] ABSTRACT

A hand tool for projecting a line by directing fluid pressure onto a projectile attached to the line. The hand tool comprises a body having an articulated distal end portion to facilitate access to difficult to reach conduits. An inflatable plug is mounted about the distal end portion for closing the entrance end of a wide inner diameter range of conduits. A barrel-like member can be used in combination with the hand tool for projecting lines between panels or walls of an existing structure.

13 Claims, 7 Drawing Sheets

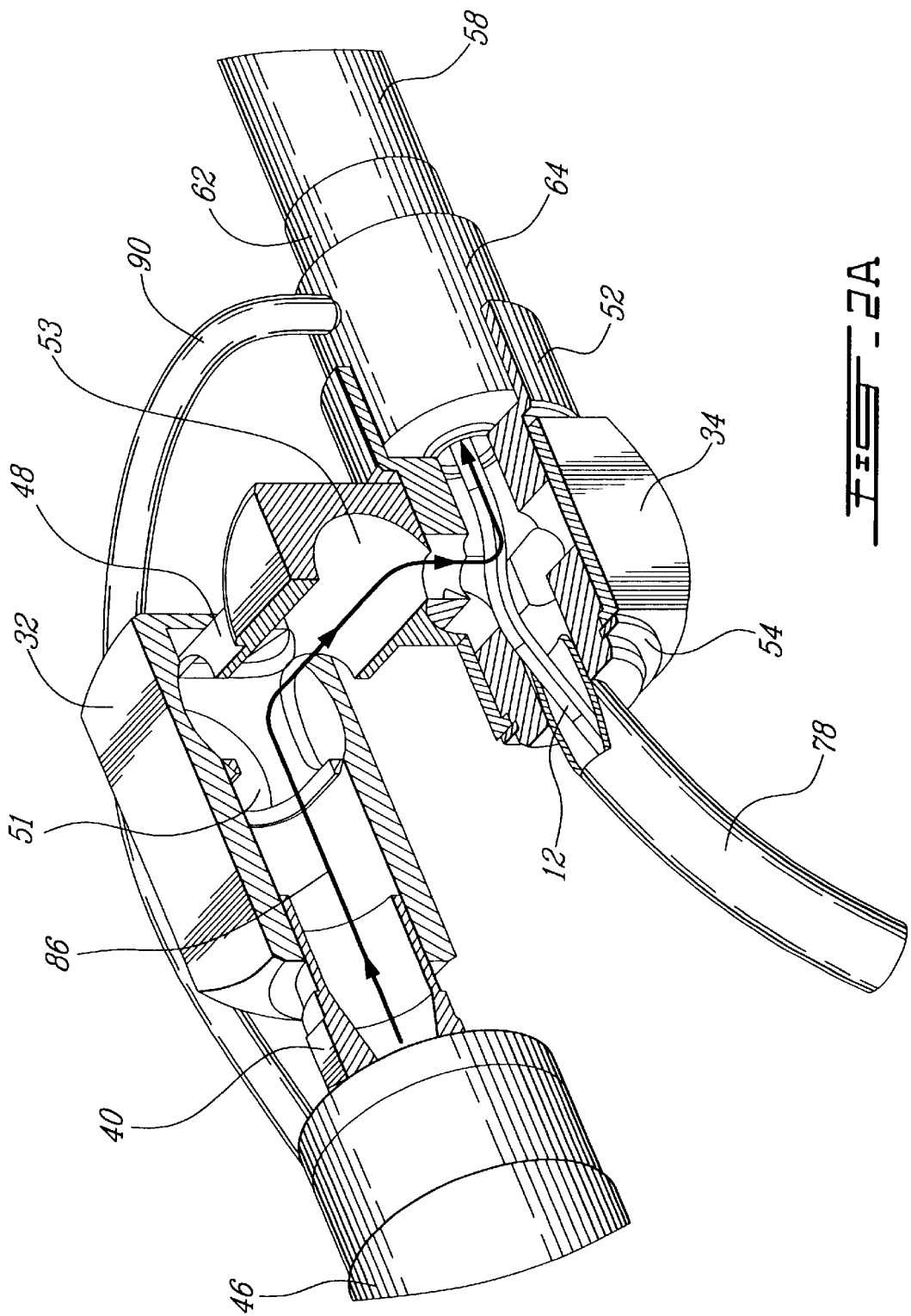

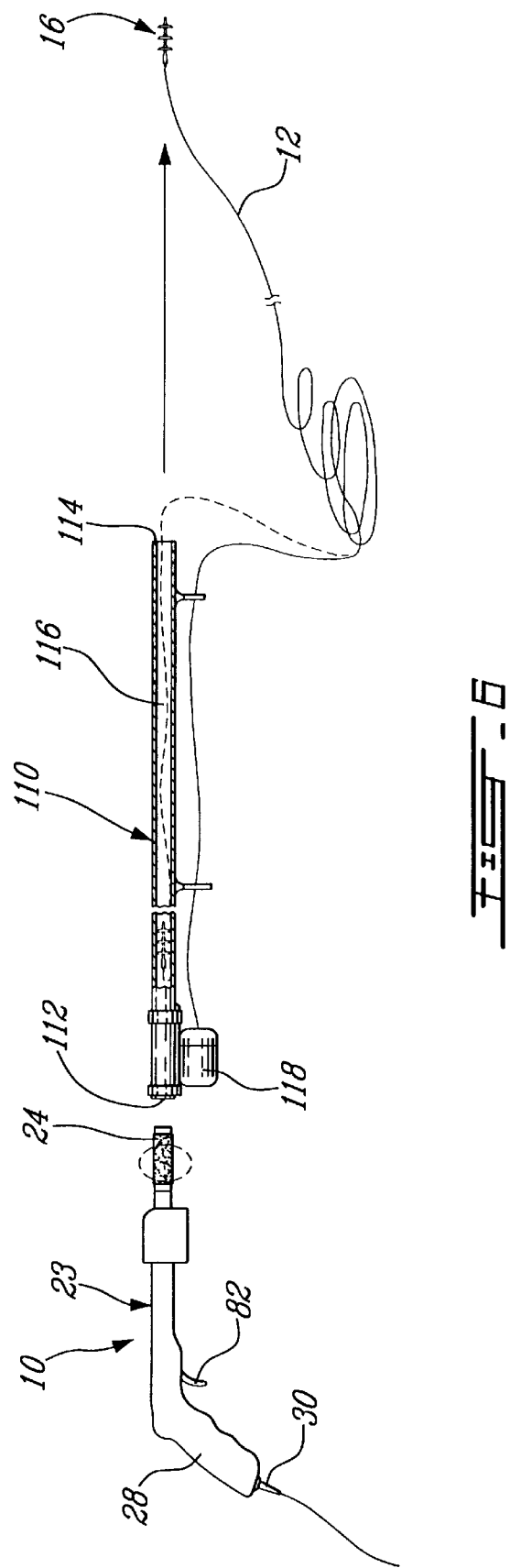

APPARATUS AND METHOD FOR PROJECTING LINES

BACKGROUND OF THE INVENTION

1. Field of the Invention

The present invention relates to the installation of lines and, more particularly, to a method an apparatus for projecting a line through a conduit or between panels or walls of an existing structure.

2. Description of the Prior Art

It is well known to pass a line in a conduit by attaching the leading end of the line to a projectile which is forced through the conduit by fluid pressure. Typically, the entry end of the conduit is sealed by a plug so that fluid pressure could be built up therein to propel the pulling projectile.

For instance, U.S. Pat. No. 4,840,352 issued on Jun. 20, 1989, to Ellis and U.S. Pat. No. 4,848,734 issued on Jul. 18, 1989, to Ford both disclose a radially expandable plug with a line passage and a fluid passage extending therethrough so that a pulling projectile can be propelled by fluid pressure through the conduit to pull a line through the plug and into the conduit.

Although the plugs described in the above mentioned patents are effective, it has been found that there is a need for a new plug which can be used for sealing a wide variety of conduits, while being lightweight and of simple construction.

In the past, as disclosed in U.S. Pat. No. 2,515,953 issued on Jul. 18, 1950 to Dufresne, it has also been proposed to use flexible tubing to facilitate access to difficult to reach conduits. However, known flexible tubes used for conveying fluid do not exhibit sufficient flexibility to allow important change of direction over small distances.

Accordingly, there is a need for an improved line projecting apparatus which is adapted to provide access to difficult to reach conduits, such as those located in constricted area.

SUMMARY OF THE INVENTION

It is therefore an aim of the present invention to provide a line projecting apparatus which is versatile;

It is also an aim of the present invention to provide such an apparatus which is adapted to seal conduit entries of various dimensions;

It is a further aim of the present invention to provide such an apparatus which is relatively simple and economical to manufacture.

Therefore, in accordance with the present invention there is provided an apparatus for projecting a line by directing fluid pressure onto a projectile attached to the line, comprising a body having a distal end portion positionable within an inlet of a conduit, a plug mounted about said distal end portion for closing the inlet of the conduit, said plug including an annular bladder which is inflatable to various radial sizes to sealingly engage conduits of different internal cross-sectional dimensions, and passage means for allowing a pressurized fluid and a line to pass through said distal end portion and into the conduit.

According to another general aspect of the present invention there is provided a hand tool for projecting a line by directing fluid pressure onto a projectile attached to the line, comprising a body having an articulated distal end portion positionable within an entrance end of a conduit, a plug mounted about said distal end portion for closing the entrance end of the conduit, and passage means for allowing a pressurized fluid and a line to pass through said distal end portion and into the conduit.

According to a further general aspect of the present invention there is provided a method of projecting a line, comprising the steps of:

attaching one end of a line to a trailing end portion of a projectile, inserting the projectile into a barrel-like member via an outlet end thereof, and directing pressurized fluid into the barrel-like member via an inlet end thereof so as to project the projectile out of the barrel-like member through the outlet end thereof, thereby pulling the line to a desired location.

BRIEF DESCRIPTION OF THE DRAWINGS

Having thus generally described the nature of the invention, reference will now be made to the accompanying drawings, showing by way of illustration a preferred embodiment thereof, and in which:

FIG. 2A is an enlarged fragmentary cross-sectional view of an articulated distal end portion of the hand tool;

FIG. 6 is a schematic side cross-sectional view of a barrel-like member used in combination with the hand tool.

DESCRIPTION OF THE PREFERRED EMBODIMENTS

Figure 1:
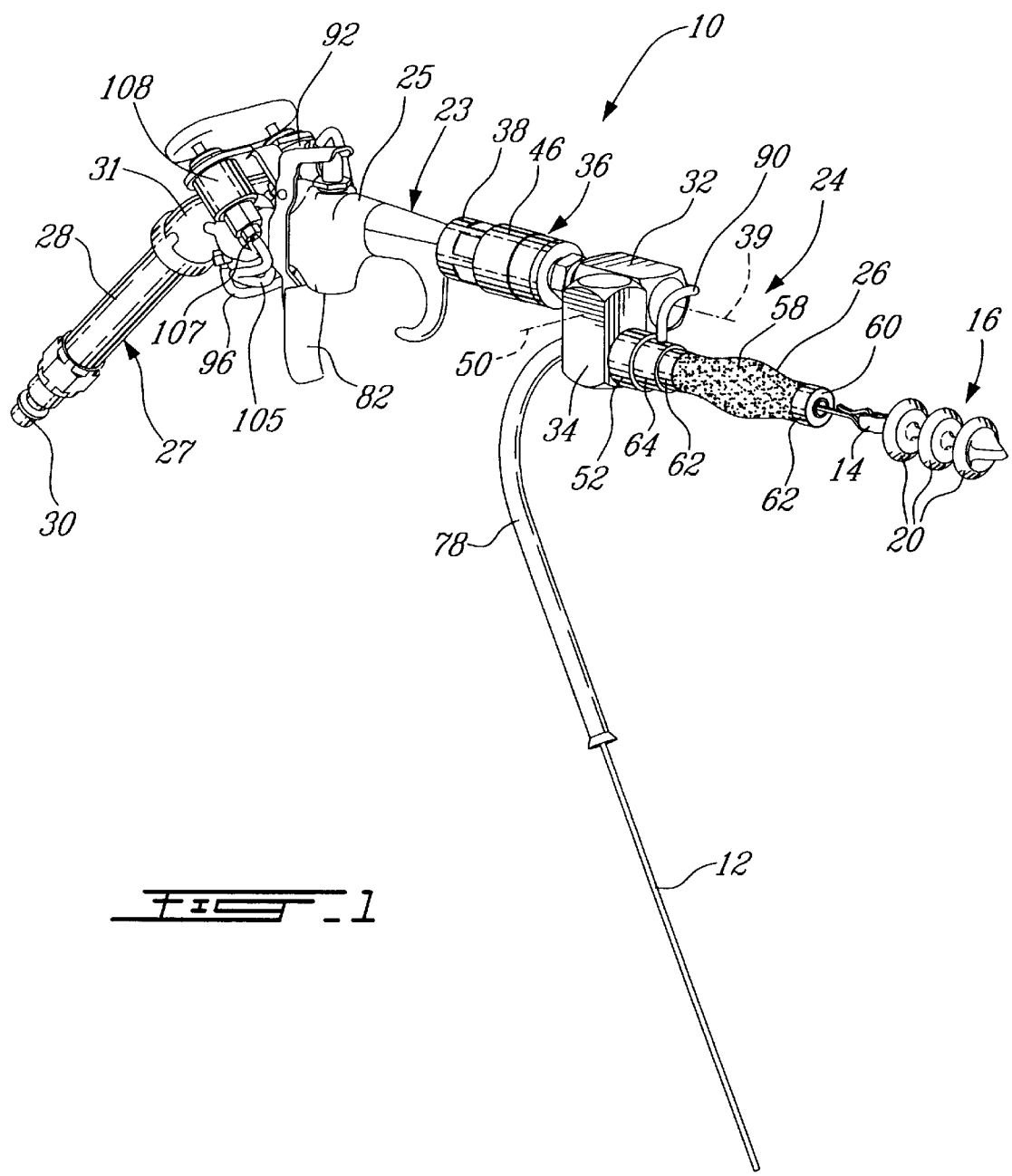
FIG. 1 is a perspective view of a hand tool for projecting a line in accordance with a first embodiment of the present invention.

Now referring to the drawings, and in particular to FIGS. 1 and 4, an apparatus for projecting lines in accordance with the present invention will be described.

First, it is noted that the term line is herein intended to mean any flexible elongated article, which has to be passed or installed in a conduit or the like. For instance, the line may consist of a guide line or tape used to subsequently fish conductor lines, electric wires or cables through conduits or panels, such as floor and walls, of an existing structure.

The apparatus is provided in the form of a hand tool or gun 10 adapted to be connected to a source of fluid pressure (not shown) for projecting a line 12 attached to a trailing end 14 of a projectile 16 snugly received within a conduit C (see FIG. 4) or the like.

The projectile 16 comprises a flexible stem 18 on which a number of axially spaced-apart flexible conical caps 20 are distributed. Each conical cap 20 is provided with a peripheral frusto-conical skirt 22 adapted to engage the inner peripheral surface of the conduit C so that the projectile 16 can be propelled through the conduit C by means of fluid pressure built up in the conduit C on a downstream side of the projectile 16. The flexibility of the stem 18 along with the deflected surfaces formed by the outer surfaces of the frusto-conical skirts 22 facilitate the passage of the projectile 16 through angular bends of the conduit C. It is understood that the projectile 16 is formed of a low friction material.

The hand tool 10 has a body 23 including a an articulated distal end portion 24, an intermediate portion 25 and a handle portion 27. As seen in FIG. 4, the articulated distal end portion 24 is configured to be removably insertable within the conduit C. An inflatable plug 26 or bladder is provided at the articulated distal end portion 24 of the hand tool 10 for preventing the escape of fluid pressure from the entry end of the conduit C so that the projectile 16 can be propelled by fluid pressure delivered into the conduit through the articulated distal end portion 24.

Figure 2:
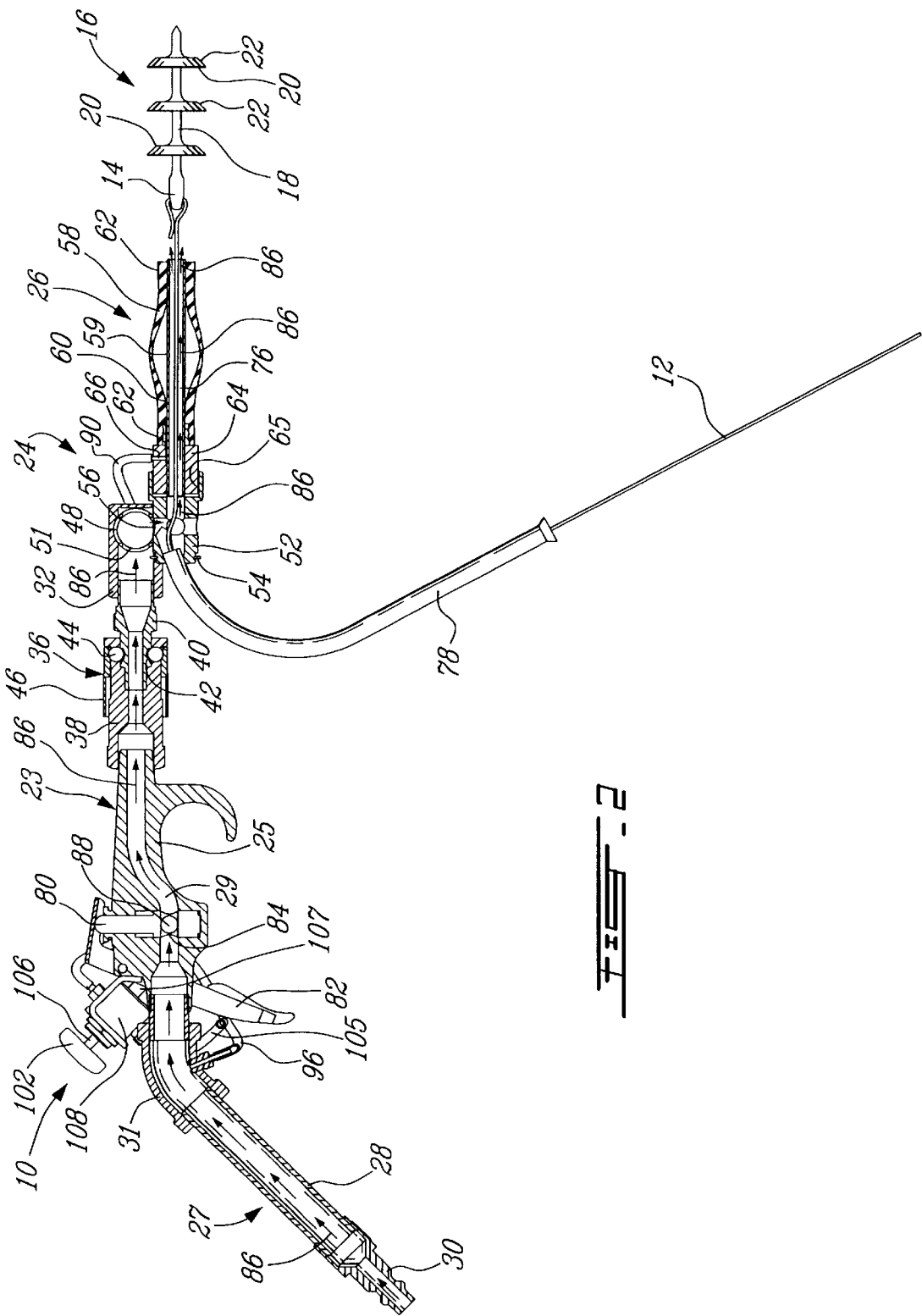
FIG. 2 is a longitudinal cross-sectional view of the hand tool of FIG. 1, wherein parts have been omitted for clarity purposes.
Figure 3:
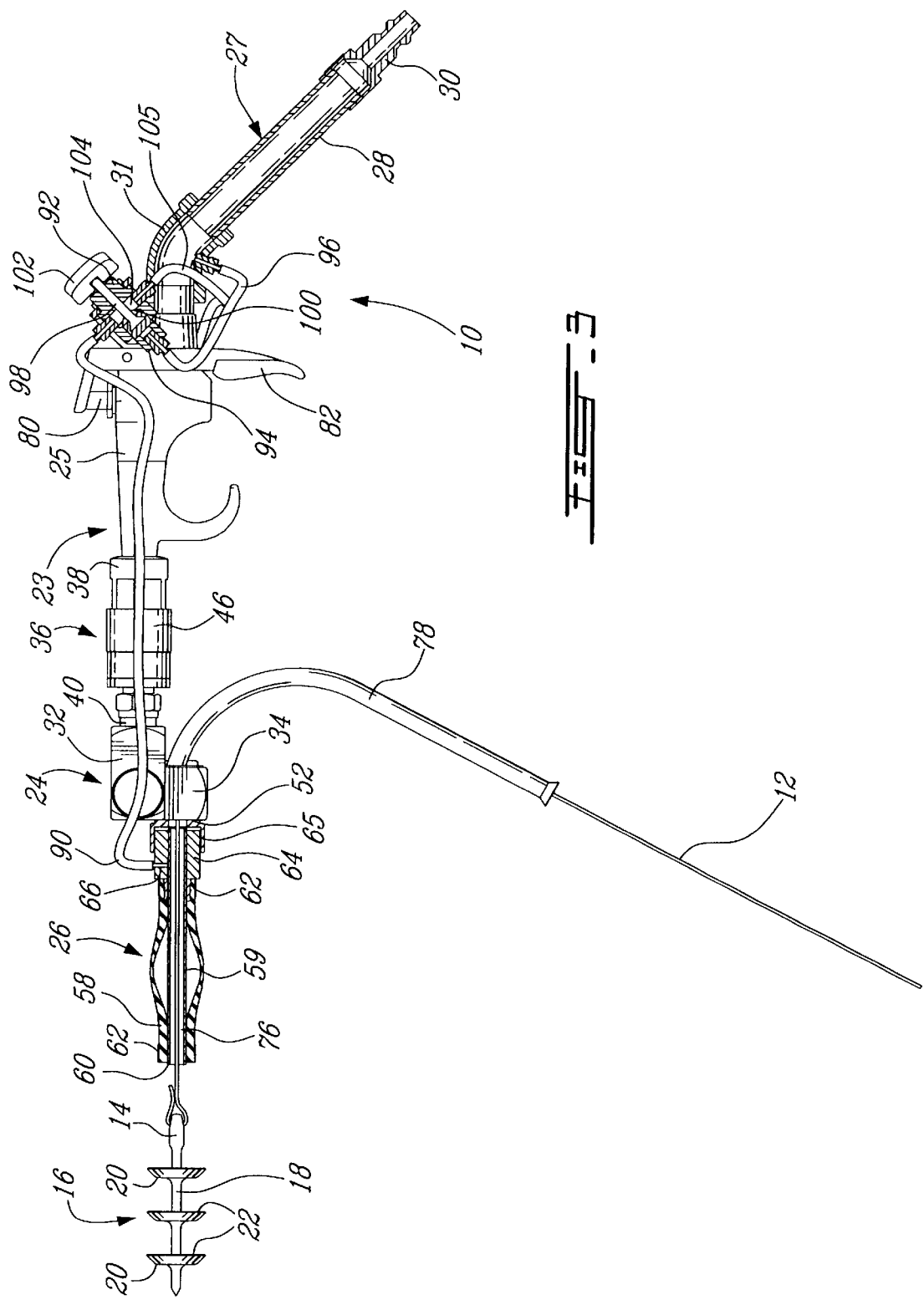
FIG. 3 is a longitudinal view, partly in cross-section, of the hand tool illustrating a secondary fluid line adapted to be connected to a source of pressurized fluid to cause the radial expansion of an inflatable plug.

Referring now to FIGS. 1 to 3, it can be seen that the handle portion 27 is formed by an elongated tubular member 28 connected in flow communication with a passage 29 defined in the intermediate portion 25 of the body 23 by a curved tubular member 31. A conventional connector 30 is provided at the free end of the elongated tubular member 28 for connecting the hand tool 10 to a source of fluid pressure (not shown).

The articulated distal end portion 24 comprises first and second hollow segments 32 and 34. The first hollow segment 32 is connected in flow communication to the intermediate portion 25 via a releasable coupling 36. As seen in FIG. 2, the coupling 36 comprises a female connecting piece 38 pressure fitted at one end thereof over the downstream end of the intermediate portion 25. A cooperating male connecting piece 40 pressure fitted within the upstream end of the first hollow segment 32 is received and positionaly supported within the female connecting piece 38 for swiveling movement about a first axis 39. The male connecting piece 40 defines an annular peripheral groove 42 in which balls 44 are engaged for retaining the female and male connecting pieces 38 and 40 together. The male connecting piece 40 may be readily withdrawn from the female connecting piece 38 by pushing a spring biased collet 46 over the female connecting piece 38 so as to disengage the balls 44 from the annular peripheral groove 42, as is well known in the art.

As seen in FIG. 2A, the second hollow segment 34 is pivotally mounted to the first hollow segment 32 via a hollow pivot pin 48 which can be integral or fixed to the second hollow segment (see FIG. 1). This allows the second hollow segment 34 to be rotated with respect to the first hollow segment 32 about a second axis 50 which is perpendicular to the first axis 39. A first bore 51 is defined at one end of the hollow pivot pin 48 to allow the pressurized fluid to flow from the first hollow segment 32 into the pivot pin 48. The pressurized fluid travels axially within the pivot pin 48 and enters into the second hollow segment 34 via a second bore 53 defined at the opposed end of the hollow pivot pin 48. This arrangement allows the second hollow member 34 to assume various angular positions relative to the first hollow segment 32, while remaining in fluid communication therewith at all times.

Figure 4:
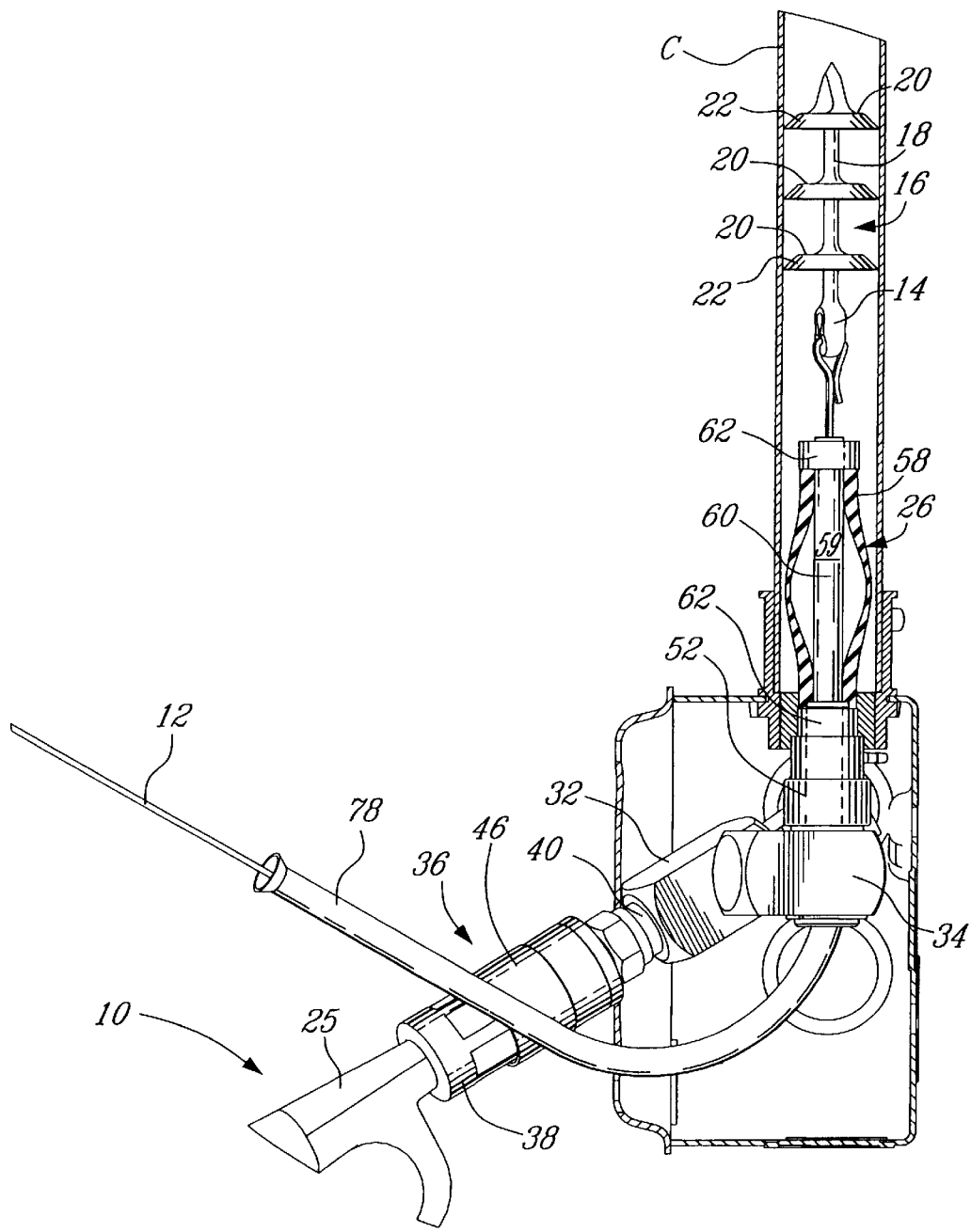
FIG. 4 is an enlarged fragmentary view of the articulated distal end portion of the hand tool placed in position at one end of a conduit.

Moreover, as seen in FIG. 4, the above described arrangement of the articulated distal end portion 24 advantageously facilitates access to difficult to reach conduits, particularly those located in constricted areas, such as electric outlet boxes.

The inflatable plug 26 is connected to the second hollow segment 34 through an adapter 52 extending within the second hollow segment 34 and retained therein by means of a clip 54. The adapter 52 defines a passages 56 for receiving fluid pressure from the second hollow segment 34 and subsequently directing it through the plug 26.

Figure 5:
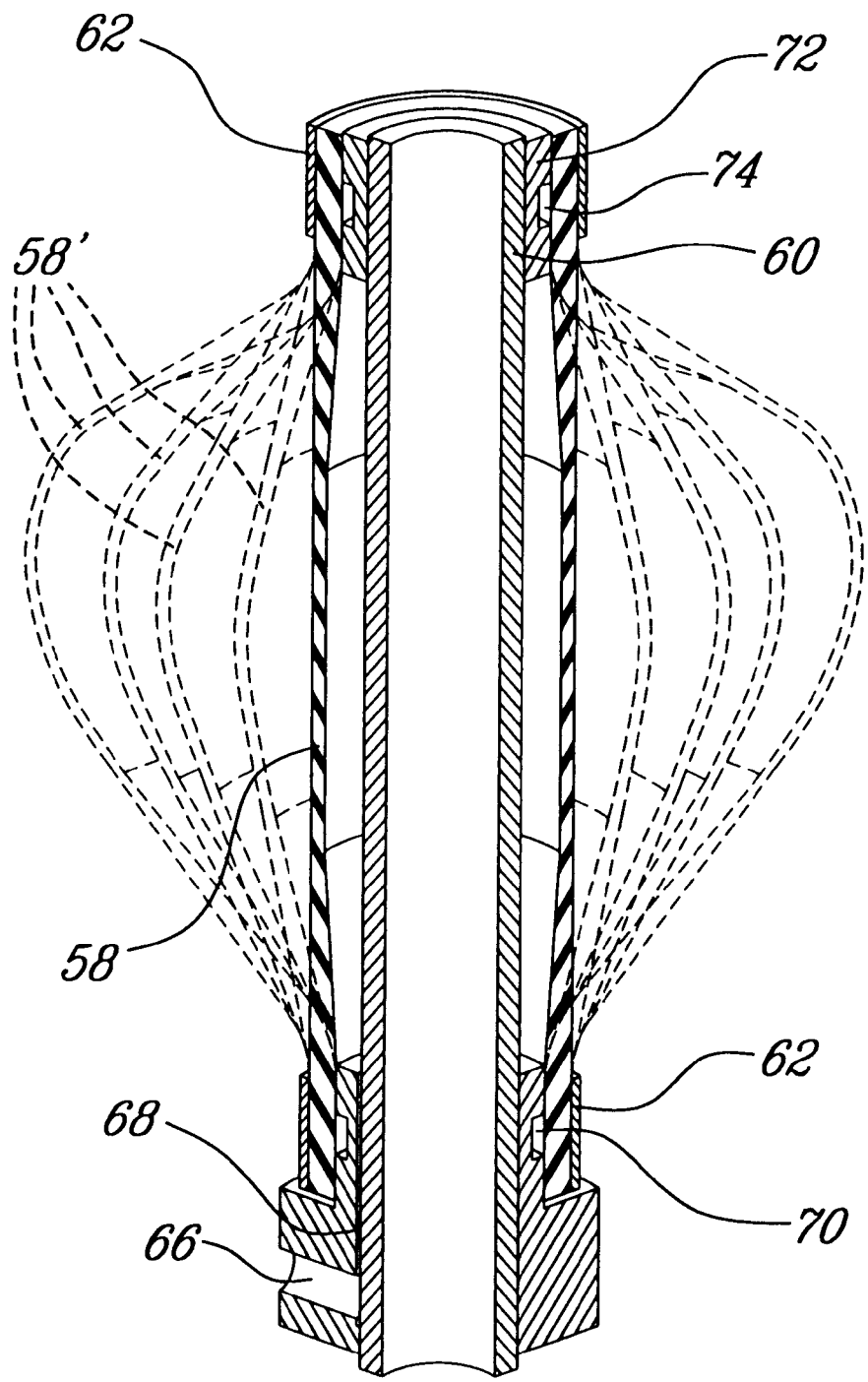
FIG. 5 is a perspective view of the inflatable plug shown at various levels of inflation.

As seen in FIGS. 2, 3 and 5, the inflatable plug 26 comprises an elastomeric sleeve 58 sealingly attached at opposed ends thereof about an outer surface 59 of an elongated tubular member 60 by means of a pair of clamp rings 62. A collar 64 is interposed between the upstream end of the elastomeric sleeve 58 and the outer surface 59 of the elongated tubular member 60. The collar 64 is pressure fitted in a socket portion 65 defined in the adapter 52 so as to maintain the elongated tubular member 60 in flow communication with the fluid passage 56. The collar 64 defines a radial passage 66 leading to an axially extending groove 68 defined in the inner surface of the collar 64. The groove 68 and the outer surface of the elongated tubular member 60 provides a fluid passage for admitting and exhausting a pressurized fluid between the elastomeric sleeve 58 and the outer surface 59 of the elongated tubular member 60. As seen in FIG. 5, the elastomeric sleeve 58 can be inflated at different levels for sealingly engaging a wide range of conduits.

The collar 64 is provided with an outer peripheral groove 70 in which the elastomeric sleeve 58 may be compressed by the clamp ring 62 disposed thereabove. As seen in FIG. 5, an optional collar 72 defining an annular peripheral groove 74 may be mounted at the free end of the elongated tubular member 60 to provide another grooved compression surface for the elastomeric sleeve 58.

The thickness of the elastomeric sleeve 58 may gradually reduce towards a mid point between the ends of the sleeve 58 in order to maximize the level of inflation.

The elongated tubular member 60 defines an axially extending central passage 76 through which the pressurized fluid may be delivered to propel the projectile 16 forward within the conduit C.

A flexible tube 78 is connected in communication with passages 56 defined in the adapter 52 for allowing the line 12 to pass through the inflatable plug 26 via the central passage 76 and into the conduit C in response to the advancement of the projectile 16 in the conduit C. However, it is understood that the line passage and the fluid passage could be completely independent.

As shown in FIG. 2, a valve member 80 in the form of a plunger is disposed in the passage 29 between the downstream and upstream ends of the intermediate member 25 to control the flow of pressurized fluid into the conduit C through the articulated distal end portion 24 and the inflatable plug 26. A trigger 82 pivotally mounted to the intermediate portion 25 may be manually pivoted in a clockwise direction to the position shown in FIG. 2 to displace the valve member 80 in a downward direction so as to align a first transversal bore 84 defined therethrough with the passage 29, thereby allowing the pressurized fluid to flow through the articulated distal end portion 24 and the elongated tubular member 60 of the inflatable plug 26, and into the conduit C, as indicated by arrows 86. A second transversal bore 88 perpendicular to the first transversal bore 84 may be defined in the valve member 80 to ensure that, even though the valve member 80 has been rotated upon itself, the fluid flow will not be blocked when the valve member 80 is in an open position thereof. A compression spring (not shown) may be disposed beneath the valve member 80 to normally urge the same in a closed position thereof.

As seen in FIG. 3, a flexible tube 90 is connected to the radial passage 66 defined in the collar 64 for directing fluid pressure through the passage defined by the groove 68 and the outer surface 59 of the elongated tubular member 60 and into the inner space defined between the elastomeric sleeve 58 and the outer surface 59 of the elongated tubular member 60. The flexible tube 90 is connected at an opposed end thereof to a valve body 92 secured to the intermediate portion 25 of the hand tool 10. The valve body 92 has an inlet port 94 connected in flow communication with the handle portion 27 by a second flexible tube 96. A first valve member 98 in the form of a plunger is provided for normally sealingly engaging a valve seat 100 to block fluid flow through the valve body 92. The first valve member 98 is connected at an upper end thereof to an actuator pad 102 which may be manually operated to displace the first valve member 98 between closed and open positions thereof. More particularly, the valve member 98 may be displaced to its open position, as illustrated in FIG. 3, by exerting a pressure on the actuator pad 102 directly above the valve member 98 so as to displace the same away from the valve seat 100, thereby allowing the pressurized fluid to flow through the flexible tube 90 and between the elastomeric sleeve 59 and the outer surface 59 of the elongated tubular member 60 to cause the radial expansion of the sleeve 59.

A bypass passage 104 is defined in the valve body 92 downstream of the valve seat 100 and is connected in flow communication with a third flexible tube 105 which is, in turn, connected in flow communication with the inlet port 107 of a second valve body 108 secured to the intermediate portion 25 of the hand tool 10 and having an outlet port (not shown) opening to the atmosphere. A second valve member 106 identical to the first valve member 98 is disposed in the second valve body 108 to normally prevent the escape of fluid pressure from the inner space defined between the outer surface 59 of the elongated tubular member 60 and the elastomeric sleeve 58 through the outlet port (not shown) of the second valve body 108. When it is desired to deflate the elastomeric sleeve 58, one has just to apply a pressure on the actuator pad 102 directly above the second valve member 106 so as to displace the same to an open position thereof, thereby allowing the fluid pressure contained between the elastomeric sleeve 58 and the outer surface 59 of the elongated tubular member 60 to escape through the outlet port (not shown) of the second valve body 108.

In operation, the projectile 16 and the articulated distal end portion 24 of the hand tool 10 are subsequently introduced in position within the entry end of the conduit C, as illustrated in FIG. 4. Then, the elastomeric sleeve is inflated to prevent the escape of fluid pressure from the entry end of the conduit C. Once the elastomeric sleeve 58 has been inflated in sealing engagement with the inner surface of the conduit C, fluid pressure is introduced in the conduit C via the elongated tubular member 60. The line 12 is drawn behind the projectile 16 as it travels through the conduit C due to fluid pressure exerted thereon.

FIG. 6 illustrates another application of the present invention wherein a barrel-like member 110 is used in combination with the hand tool 10 to project a line between panels or walls of an existing structure (not shown).

The barrel-like member 110 comprises an inlet end 112 and outlet end 114 connected together by an axially extending passage 116. The inlet end 112 is configured and sized to receive the distal end portion 24 of the hand tool 10 and to be sealingly closed by the inflatable plug 26 so that the barrel-like member 110 forms a forward extension of the hand tool 10.

A supply reel 118 may be attached to the barrel-like member 110. A number of space-apart guides 112, such as eyelets, may be provided on the outer surface of the barrel-like member 110 for directing the line 12 as it is unwound from the supply reel 118.

In use, the distal end portion 24 of the hand tool 10 is inserted in position within the inlet end 112 of the barrel-like member 110 and then the inflatable plug 26 is inflated in sealing engagement with the inner surface of the barrel-like member 110. Thereafter, a sufficient length of line 12 is unwound from the supply reel 118. Then, the projectile is loaded into the barrel-like member 110 through the outlet end 114 thereof. Finally, the hand tool 10 is operated to direct fluid pressure within the barrel-like member 110 so as to project the projectile 16 out of the barrel-like member 110 and thus draw the line to a desired location.

What is claimed is:

1. An apparatus for projecting a line by directing fluid pressure onto a projectile attached to the line, comprising a body having a distal end portion positionable within an inlet of a conduit, a plug mounted about said distal end portion for closing the inlet of the conduit, said plug including an annular bladder which is inflatable to various radial sizes to sealingly engage conduits of different internal cross-sectional dimensions, and passage means for allowing a pressurized fluid and a line to pass through said distal end portion and into the conduit, said apparatus being provided in the form of a hand tool adapted to be connected to a source of pressurized fluid, said hand tool being provided with first and second control means respectively adapted to control the flow of pressurized fluid through said passage means and the level of inflation of said annular bladder.

2. An apparatus as defined in claim 1, wherein said annular bladder includes an elastomeric sleeve sealingly attached at opposed ends thereof to an outer surface of said distal end portion of said body.

3. An apparatus as defined in claim 2, wherein clamp means are provided for sealingly securing said elastomeric sleeve to said outer surface of said distal end portion.

4. An apparatus as defined in claim 2, wherein a secondary passage is provided for admitting and exhausting pressurized fluid between said elastomeric sleeve and said outer surface of said distal end portion, said secondary passage being independent of said passage means for allowing a pressurized fluid and a line to pass through said distal end portion.

5. An apparatus as defined in claim 4, wherein said secondary passage extends through an adapter disposed between said elastomeric sleeve and said outer surface of said distal end portion at one of said opposed ends of said elastomeric sleeve.

6. An apparatus as defined in claim 1 further comprising a barrel-like member adapted to be disposed in communication with said passage means, said barrel-like member including a tubular elongated body having an inner wall sealingly engageable with said annular bladder, said barrel-like member being configured to receive a projectile and a portion of the line attached thereto.

7. An apparatus as defined in claim 6, wherein guide means are provided on an outer surface of said barrel-like member to direct the line as the same is drawn from a supply source in response to movement of the projectile.

8. An apparatus as defined in claim 1, wherein said first control means include a manually operable valve comprising a plunger defining at least one transversal bore, said plunger being displaceable between an open position wherein said transversal bore is in flow communication with said passage means, and a closed position wherein said plunger blocks fluid flow through said passage means.

9. An apparatus as defined in claim 1, wherein said second control means include first and second manually operable valves respectively adapted to control the level of inflation of said annular bladder.

10. An apparatus as defined in claim 1, wherein said passage means include a main passage for allowing both the line and the pressurized fluid to pass though said distal end portion and into the conduit.

11. An apparatus as defined in claim 1, wherein said distal end portion is articulated.

12. An apparatus as defined in claim 11, wherein said distal end portion includes a first segment mounted for rotation about a first axis, and a second segment mounted to said first segment for rotation about a second axis perpendicular to said first axis.

13. A hand tool for projecting a line by directing fluid pressure onto a projectile attached to the line, comprising a body having an articulated distal end portion positionable within an entrance end of a conduit, a plug mounted about said distal end portion for closing the entrance end of the conduit, and passage means for allowing a pressurized fluid and a line to pass through said distal end portion and into the conduit, said distal end portion including a first segment mounted for rotation about a first axis, and a second segment mounted to said first segment for rotation about a second axis perpendicular to said first axis.

\* \* \* \* \*